United States Patent [19]

Glansk et al.

[11] Patent Number: 5,291,920
[45] Date of Patent: Mar. 8, 1994

[54] APPARATUS FOR MEASUREMENT AND CONTROL, RESPECTIVELY, OF TEMPERATURE AND/OR PRESSURE

[75] Inventors: Leif Glansk, Fristad; Leif Marstorp, Ljung, both of Sweden

[73] Assignee: Tour & Andersson AB, Sweden

[21] Appl. No.: 910,083

[22] PCT Filed: Jan. 15, 1991

[86] PCT No.: PCT/SE91/00024
§ 371 Date: Jul. 10, 1992
§ 102(e) Date: Jul. 10, 1992

[87] PCT Pub. No.: WO91/10852
PCT Pub. Date: Jul. 25, 1991

[30] Foreign Application Priority Data

Jan. 15, 1990 [SE] Sweden ............................ 9000125
Aug. 28, 1990 [SE] Sweden ............................ 9002744

[51] Int. Cl.⁵ .............................................. F16K 51/00
[52] U.S. Cl. ........................................ 137/560; 251/145
[58] Field of Search ............... 251/145, 216; 137/317, 137/557, 560

[56] References Cited

U.S. PATENT DOCUMENTS

2,830,261 4/1958 Estelle ........................... 137/560 X
5,235,324 8/1993 Gagnelia ........................ 137/557 X

FOREIGN PATENT DOCUMENTS

493426 5/1950 Belgium .......................... 251/145
0153427 9/1985 European Pat. Off. .
0221464 5/1987 European Pat. Off. .
1110157 4/1968 United Kingdom .

*Primary Examiner*—John B. Fox
*Attorney, Agent, or Firm*—Davis, Bujold & Streck

[57] ABSTRACT

A combined control and regulating valve (1) having a housing (2) with an inlet (3) and an outlet (4) as well as a partition (5) between said inlet and outlet and having a seat (6) designed for an interaction with a main valve body (7), which is adjustable from outside. Said inlet and said outlet are connected to one measuring nipple each (31-39 and 41-49 respectively) for the measurement and the control of temperature and/or pressure. One of the measuring nipples (41-49) is designed as a multiple function nipple (50) having a cutt-off-function designed to interact with a seat (53) in a passage (40), which receives said nipple. In a housing neck (55), which encloses said nipple, are access openings (56) disposed, through which e.g. water can be discharged or filled, when said nipple is in its outer screwing position. Said neck is enclosed by a completely closed casing (57) or a casing (57') having a connection (60), which casing is retained by means of a nut (66) screwable on said neck, said nut having an opening (67), through which the outer end of said measuring nipple projects, at which end the nipple is provided with an inner insertion and control opening (38) as well as a cover (37), which covers said opening.

10 Claims, 5 Drawing Sheets

APPARATUS FOR MEASUREMENT AND CONTROL, RESPECTIVELY, OF TEMPERATURE AND/OR PRESSURE

FIELD OF THE INVENTION

The present invention relates to an apparatus, particularly a combined control and regulating valve for liquids.

BACKGROUND OF THE INVENTION

Such valves are used e.g. in heating and cooling systems as well as in tap water systems and they are designed to regulate and cut off respectively a liquid flow, allow a measurement of the pressure difference, allow a discharge and/or filling of liquid and/or a temperature measurement. This valve suitably is designed to allow a presetting of the liquid flow, e.g. by means of the wheel, which is manually controlled or driven by a motor.

The valves used so far for this purpose are often very complicated and expensive to produce, assemble and mount as well as to handle. Also, the various functions are usually not present in one existing valve construction or they are distributed in a not advantageous way, which makes at least some part or a few parts of the valve difficult to access, since such valves often are mounted in positions which are difficult to access. Also, there may be an increased risk of leakage and above all it is difficult or impossible to optimize the known valves as to various combinations of purposes and differently conceived plants, i.e. it is difficult to adjust the known valves to varying needs in a quick and simple way.

Such previously known valves are exemplified in EP-A2-0221464, in which alternative functions are mentioned as such, but without any specific illustration or description. EP-A1-0153427 is a typical example of separately provided measuring and tapping/refilling connectors (FIG. 1). Despite common base or connector for these functions, this is the case as well with GB-A-1 110 157, in which a connector branch houses a shut-off or throttling valve, while a different connector branch may be connected to arbitrary apparatus.

SUMMARY OF THE INVENTION

The main purpose of the present invention is to counteract and as far as is feasible eliminate the abovementioned drawbacks and to develop an improved combined control and regulating valve, which above all is distinguished by an excellent flexibility and combination and adjustment possibilities respectively as well as by a simplified handling, particularly a more focused one, the risk of incorrect results and faulty applications being decreased or eliminated entirely. Other purposes of the invention is to generally develop the state of the art in this field and to suggest a generally advantageous valve having a long service life and reliable functions.

These purposes are obtained by designing an apparatus of the type described in the introduction.

BRIEF DESCRIPTION OF THE DRAWINGS

Additional characterizing features and advantages of the present invention are set forth in the following description, reference being made to the accompanying drawings, which show some preferred but not limiting embodiments of the invention:

FIG. 3 shows an apparatus according to the invention in an axial diametrical section, which apparatus is connected to or part of a medium channel or the like;

DETAILED DESCRIPTION OF THE INVENTION

Figure 1:
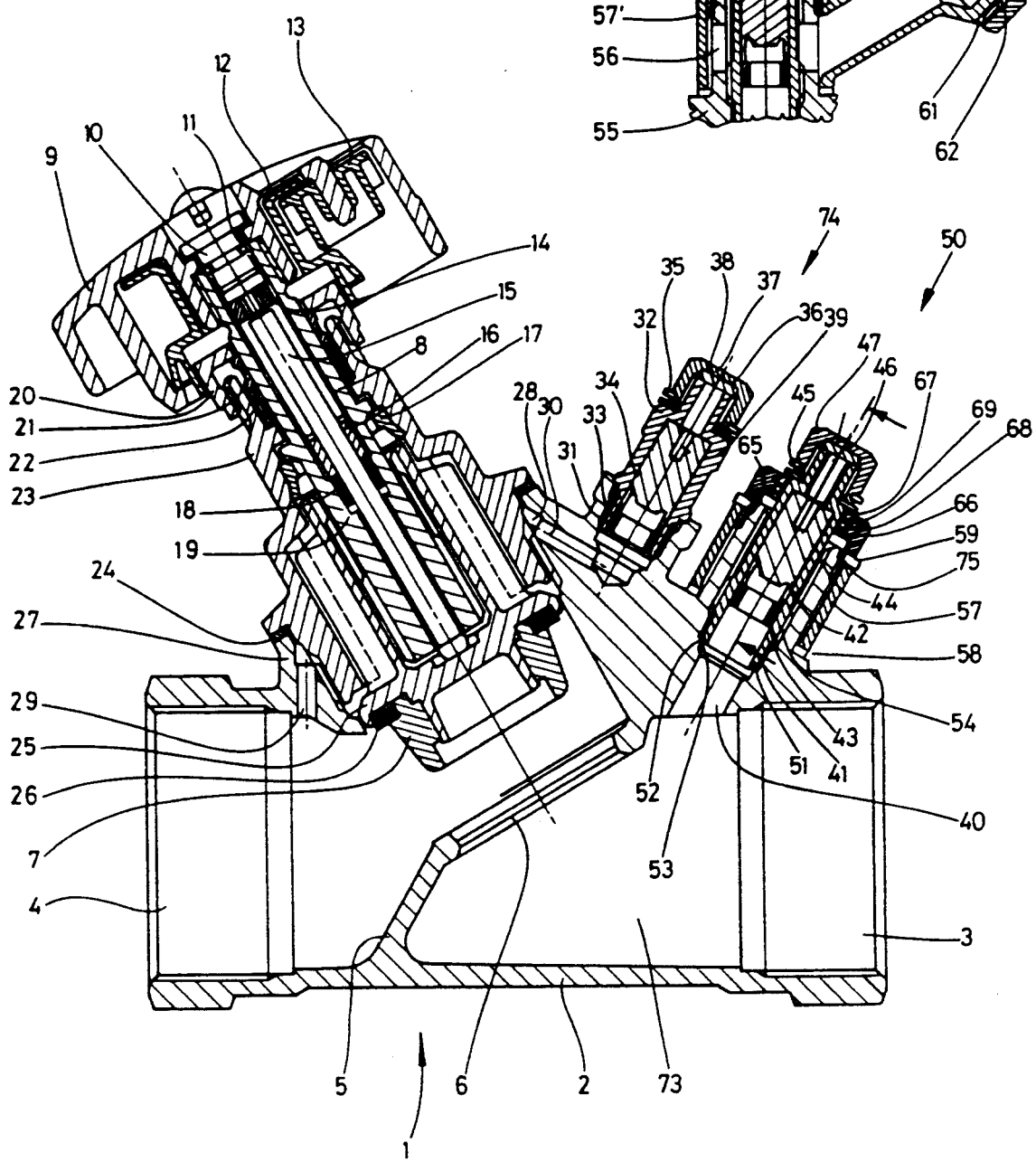
FIG. 1 shows a combined control and regulating valve according to the invention in an axial diametrical section.

The valve shown in FIG. 1 is in its entirety designated 1. It comprises a housing 2 having a medium passage or the like 73 with an inlet 3 and an outlet 4 which, of course, may have reversed functions. A partition 5 between said inlet and outlet is provided with a main seat 6, with which a main valve body 7 cooperates, which is attached to the interior end of e.g. an outer spindle 8, on the exterior end of which e.g. an adjusting wheel 9 is disposed having a wheel screw 10, an O-ring 11, an indicating ring 12, a digit wheel 13, a pre-setting screw 14, an inner spindle 15, a threaded casing 16, a lock ring 17, a stuffing box packing 18, a plate 19, a packing box nut 20, a gland 21, a stuffing box packing 22, a top piece 23, a packing 24, a cone 25, a seal ring 26, and a connecting joint 27 for said top piece. This portion of the valve mainly is in accordance with the device described in SE-A-448 651 and consequently it will not now be described in further detail Of course, another type of adjusting means, e.g. an electric motor (not shown), can also be used.

Connecting joint 27 is provided with a ring canal 28, which is inwardly open- and communicates with outlet 4 via a canal 29 and which is connected to a bore 30, which in its turn is connected to a threaded hole 31, which ends freely at the exterior side of housing 2, suitably between inlet 3 and joint 27, and which is closed at its end in the housing. A nipple 74 with a measuring portion 32 is threaded into this hole and provided with an adjusting ring 33, a sealing body 34, a holding element 35, a seal 36, a cover 37, a nipple neck opening 38 and an insertion opening 39, which two openings are designed for an insertion of a measuring probe through the sealing body 34 to measure pressure and/or temperature.

Inlet 3 communicates via a passage 40 with a multiple function nipple 50, which comprises a measuring portion 42, which suitably roughly is in accordance with the way parts 31–39 are designed as shown. Consequently, in this part of the drawing 41–49 designate parts, which correspond to parts 31–39. However, interior end 51 of measuring portion 42 is in this case provided with a bevel 52, preferably on all sides, having a valve body function designed for a sealing or closing cooperation with a seat 53, which suitably comprises a sharp step in passage 40, more precisely at the transition of the passage from an interior smooth part to an exterior threaded part 54, into which measuring nipple 42 is secured. An interaction between a sharp edge and a beveled surface results in a satisfactory sealing effect, also if no type of special sealing or packing is used, particularly in case the sharp edge is deformed somewhat and in this way possible minor irregularities easily and simply are removed.

Figure 2:
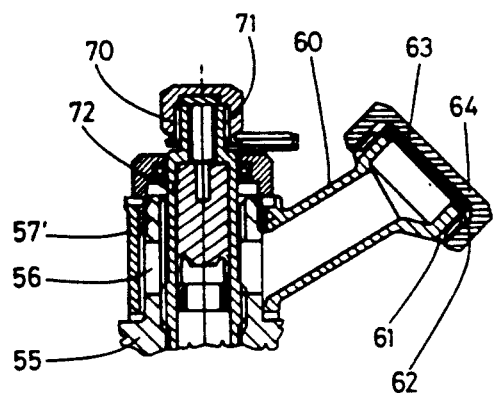
FIG. 2 also is an axial diametrical section of a differently designed embodiment of a portion of the valve shown in FIG. 1.

The cut-off function of measuring portion 42 is a novel characterizing feature according to the invention and is due to the fact that said exterior threaded part 54 of passage 40 at least partly is placed in a neck 55, which projects from housing 2, suitably in the same plane as joint 27 and parts 31-39 and which is provided with outlet openings 56 (see FIG. 2), which consequently extend through a portion of said thread. When portion 42 has been screwn outwards to such an extent, that its exterior thread has passed at least some of openings 56, liquid can flow between inlet 3 and the area outside neck 55, which normally is closed, either by means of a completely closed casing 57 having end packings 58 and 59 or by means of a casing 57' having a connection 60 (FIG. 2). In case a casing 57 which is closed on all sides is used (FIG. 1), the discharge and the filling function respectively of the multiple function nipple are dispensed with.

In the example shown in FIG. 2 connection 60 of rotatably disposed casing 57' is at its free end provided with an exterior thread 61, on which is screwed a cover 64, provided with an interior thread 62 and a packing 63, which cover consequently can be removed in order to connect a discharge or filling hose (not shown). In the two cases the exterior end of the casing is sealed by means of a nut 66, provided with an inner thread 65 and threaded onto thread 75 of neck 55, packing 59 like packing 58 being compressed in order to obtain a complete sealing of the exterior part of the neck outwards. Nut 66 is provided with a central access opening 67, into which an O-ring 69 is inserted in a groove 68 for a sealing interaction with the outer thread-free end of the measuring portion, which end is mounted with a slip fit in said access opening. However, the outer thread of the nipple must not be able to pass through this opening.

The nipple can be screwed inwards and outwards respectively, because its opening 38 is non-circular, e.g. a hexagon hole, which consequently can receive a hexagon spanner (not shown). In this way it is not necessary to remove the nipple, when e.g. liquid is to be filled or discharged, and parts 60-63 can be connected to a hose or the like, before the flow is opened up by screwing out the nipple. The outer end of the nipple, provided with an outer thread 70, is normally sealed by means of lock 37, provided with an inner thread 71, which lock is removed temporarily, when e.g. a probe (not shown) designed to measure the temperature and/or the pressure is to be inserted through holes 38,48 and 39,49 and through sealing body 34,44, preferably provided with a slit or the like 72, in order to reach inlet 3 and outlet 4 respectively.

In order to retain the cover it can by means of a hinge-like holding element 35 made of a plastic material be retained on the outer nipple end. Cover 37 does not need to provide any primary sealing function Sealing body 34 is primarily designed to seal outwards. In case it would leak, the cover will, of course have a sealing function.

Thanks to the described and shown characterizing features of the invention it is partly, possible to substitute a casing having a connecting 60 for a completely closed casing 57 without discharging the fluid from the system, which consequently can remain in operation without any limitations. Also, it is not necessary to close or open any other valves; it is only necessary to check that measuring portion 42 is in its cut-off position, shown in FIG. 1, in which nut 66 and cover 37 can be removed without eliminating the sealing function. And partly in spite of these advantages it is not necessary to open up or close any valve in order to have access to the function of the nipple as a control and measuring element respectively. Casing 57' with joint 60 can steplessly be rotated to the desired connection position within a range of action of at least about 300°.

Of course, the multiple function nipple, designed as shown and connected to the inlet, may instead be connected to the outlet or such nipples may be connected to the inlet as well as the outlet. Bore 30 can in a special case communicate with passage 40, possibly via a special cut-off valve (not shown). In such a case only one multiple function nipple may be sufficient and suitably no simple measuring nipple is to be used at all. In this case it is possible to use cut-off valves at inlet 3 as well as at outlet 4, and in this way it is possible to measure the pressure and/or temperature conditions on either side of seat 6 or on both sides simultaneously.

Figure 4:
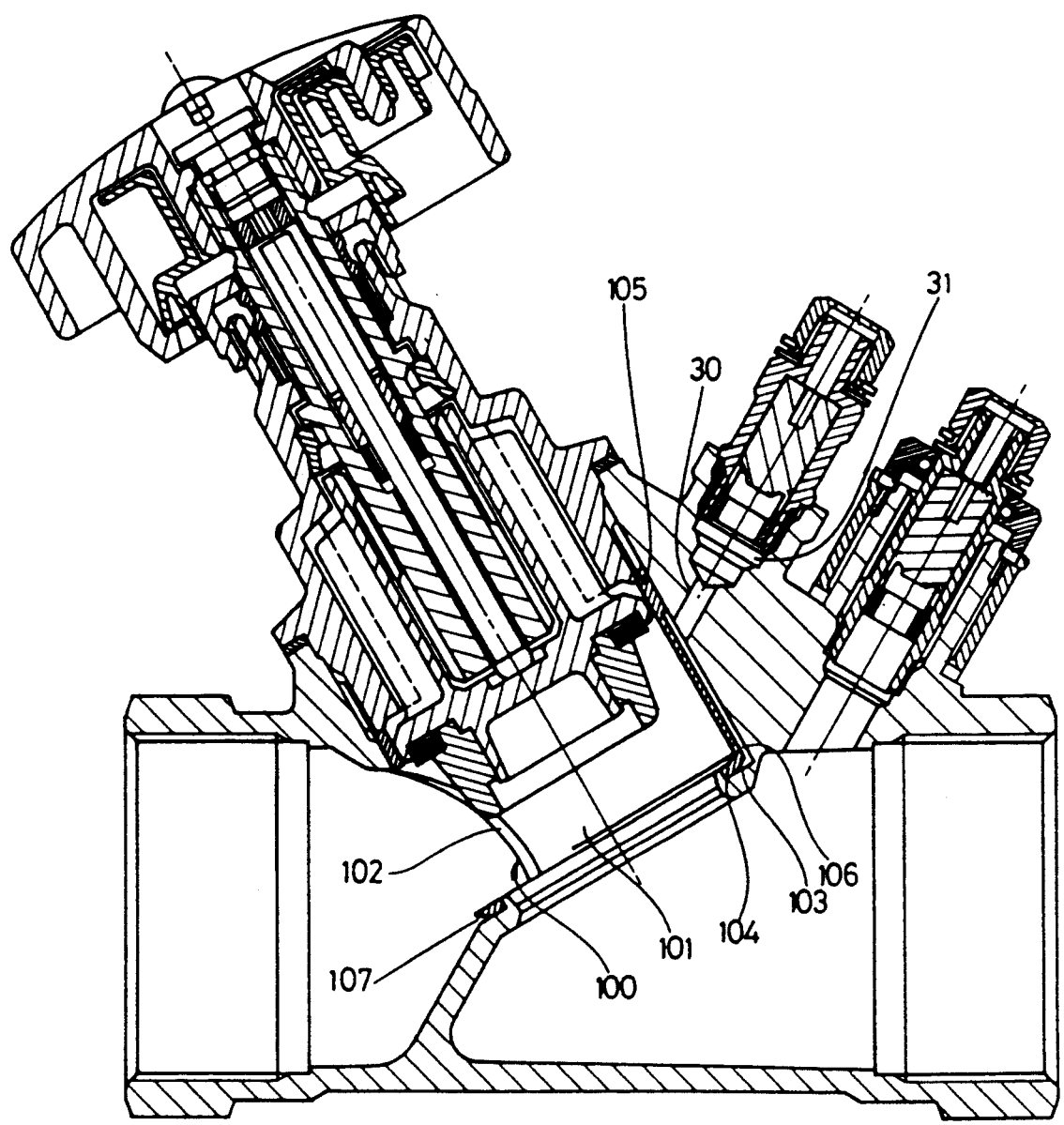
FIGS. 4, 5 and 6, respectively, show in diametrical sections various examples of connections from a measuring portion to a medium channel or the like in line with special embodiments according to the invention.

In FIG. 4 according to the present patent application the valve housing is covered, in connection with seat 6 in the direction of the valve body attachment, with a casing 100, the wall 101 of which ends in the circumferential direction at the valve housing wall, an outlet opening 102 being formed. Said casing is lowered into a groove 103 outside seat 6 itself, an inwardly collared flange 104, with that the which is turned towards the valve body, being positioned in the same plane, as the surface of seat 6, which is turned towards the body. The other end of said casing possibly has an inner bevel 105 in order to facilitate the tightening of the top piece of the valve.

In this case canal 30 is designed as a central and axial continuation of hole 31 and ends in groove 106, which extends along the main axial length of the casing and into a position below the shoulder of the flange 104 and around the flange on all sides to terminate in an opening 107 on the diametrically opposite side of said seat in relation to said nipples. Through this opening a pressure signal can be received into e.g. one of the nipples.

Said casing can be stationarily fastened in said valve housing in a way known per se, and in this way opening 102 can not unintentionally change its position. The casing can be made of a metal and/or a plastic material. It can also, if this is desired, form a part of the seat or even the entire seat. The opening is preferably comparatively compact and not slot-like.

Figure 5:
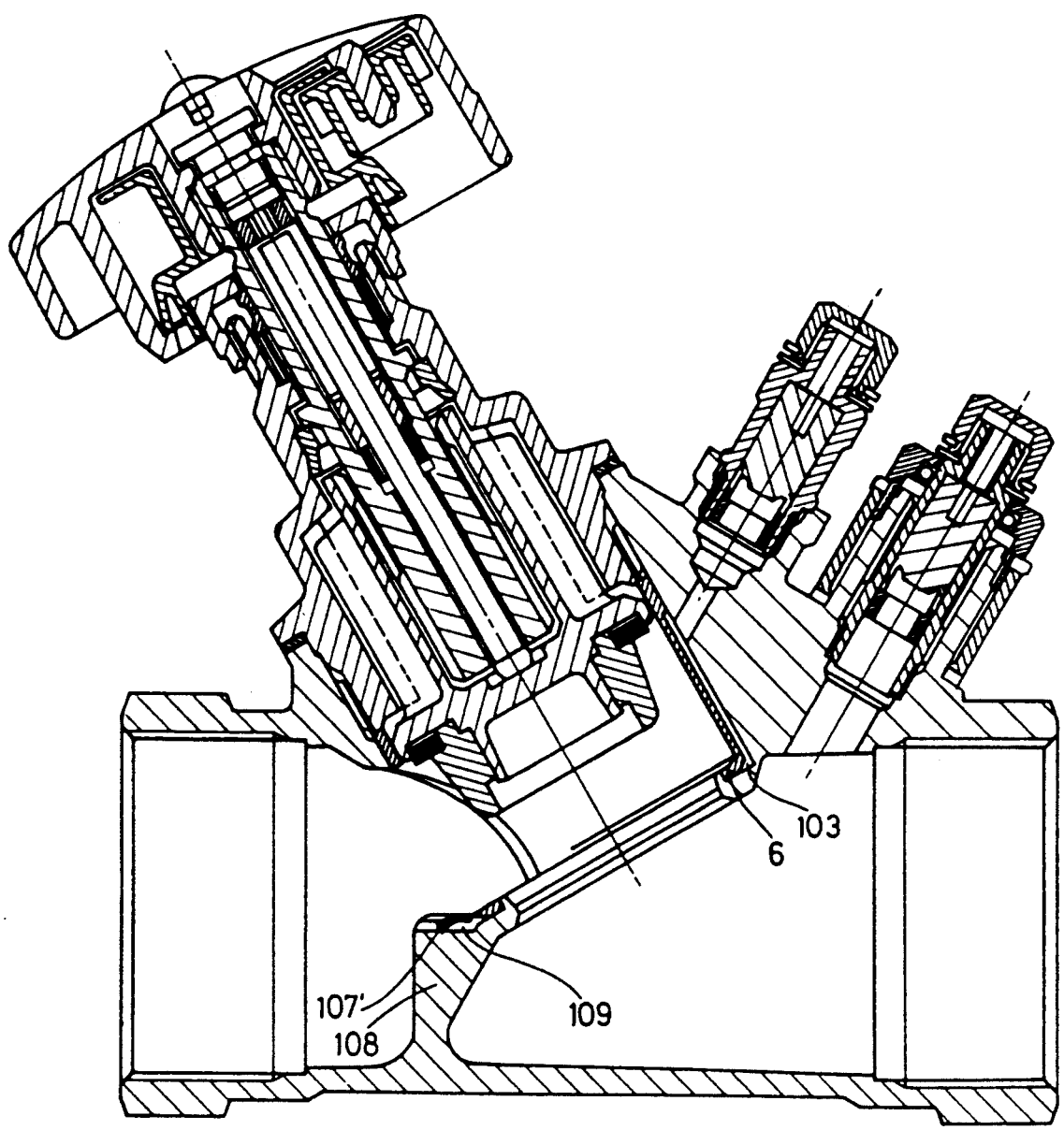

As an alternative embodiment opening 107' can according to FIG. 5 be placed in a thick part 108 of seat 6 and be formed of the outer end of a canal 109, which is drilled through this thick part, which canal with its inner end is connected to groove 103.

In accordance with an embodiment not shown such a thick part, the purpose of which it is e.g. to remove said opening away from the area around the seat, can be designed as a continuation of opening 102 or of the casing material beyond seat 6 in relation to the nipples, which casing material can bear against central wall 5.

Figure 6:
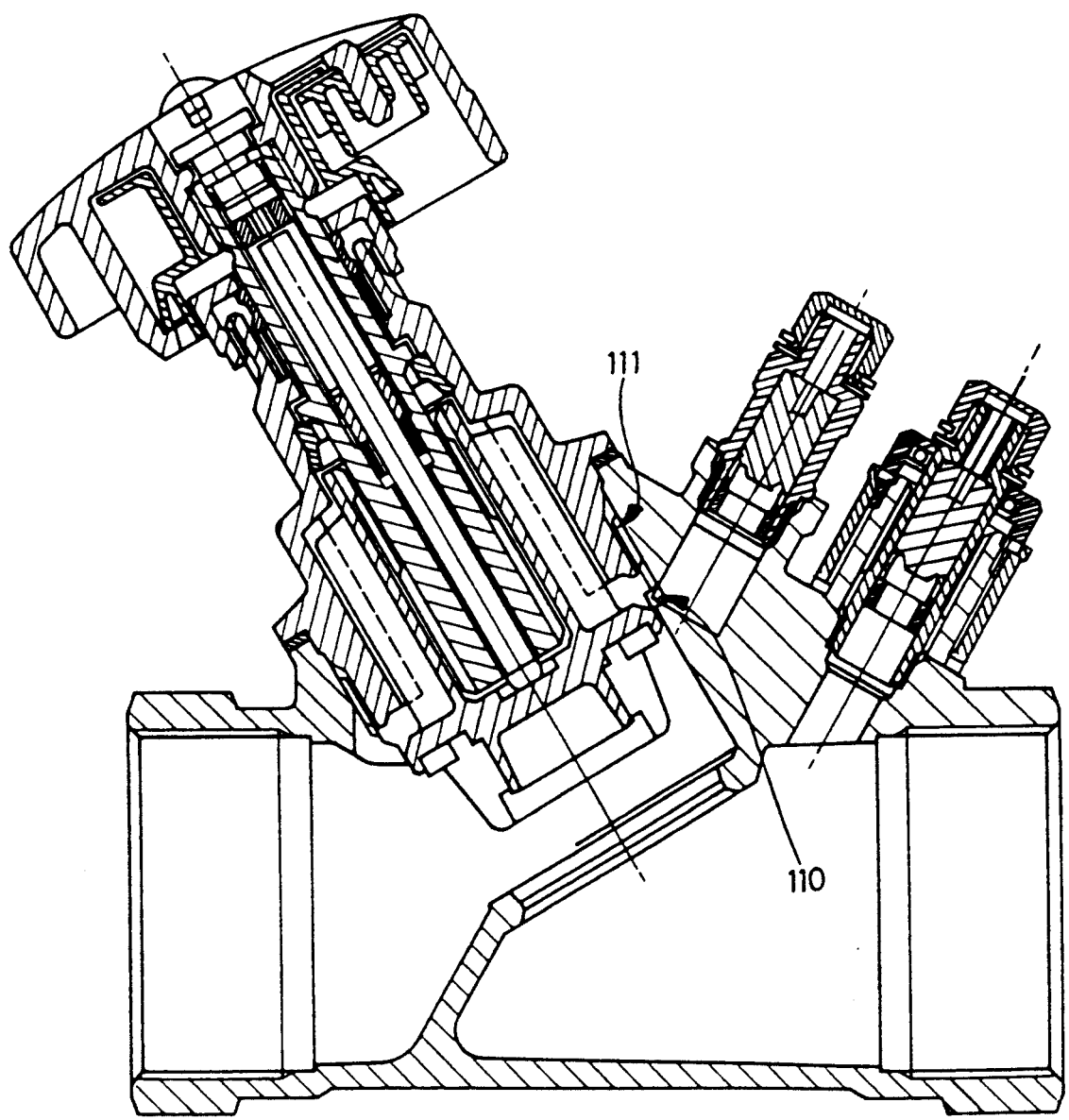

The embodiment shown in FIG. 6 is particularly advantageous as far as the manufacturing goes, since the drilling of a special canal 30 is avoided, which is replaced by an extension of hole 31, which in the bottom area contacts the threaded hole, into which the top piece of the valve is screwed, namely right against the end or the inner step of this hole, an opening 110 being formed, the free access of which to the area between the top piece of the valve and the valve cone suitably is guaranteed by means of a recess 111, which can be done in the form of an axial canal 111, which simply can extend along and through all the threading in the hole for the top piece of the valve, which as to the manufacturing is particularly simple. That part of the canal, which is covered by the top piece of the valve, of course does not serve any purpose. Merely the free part between the top piece of the valve and the valve cone in and immediately adjacent opening 110 are within this area used to remove the unnecessary and disturbing threading and guarantee that a pressure signal can be received without disturbances.

Figure 3:
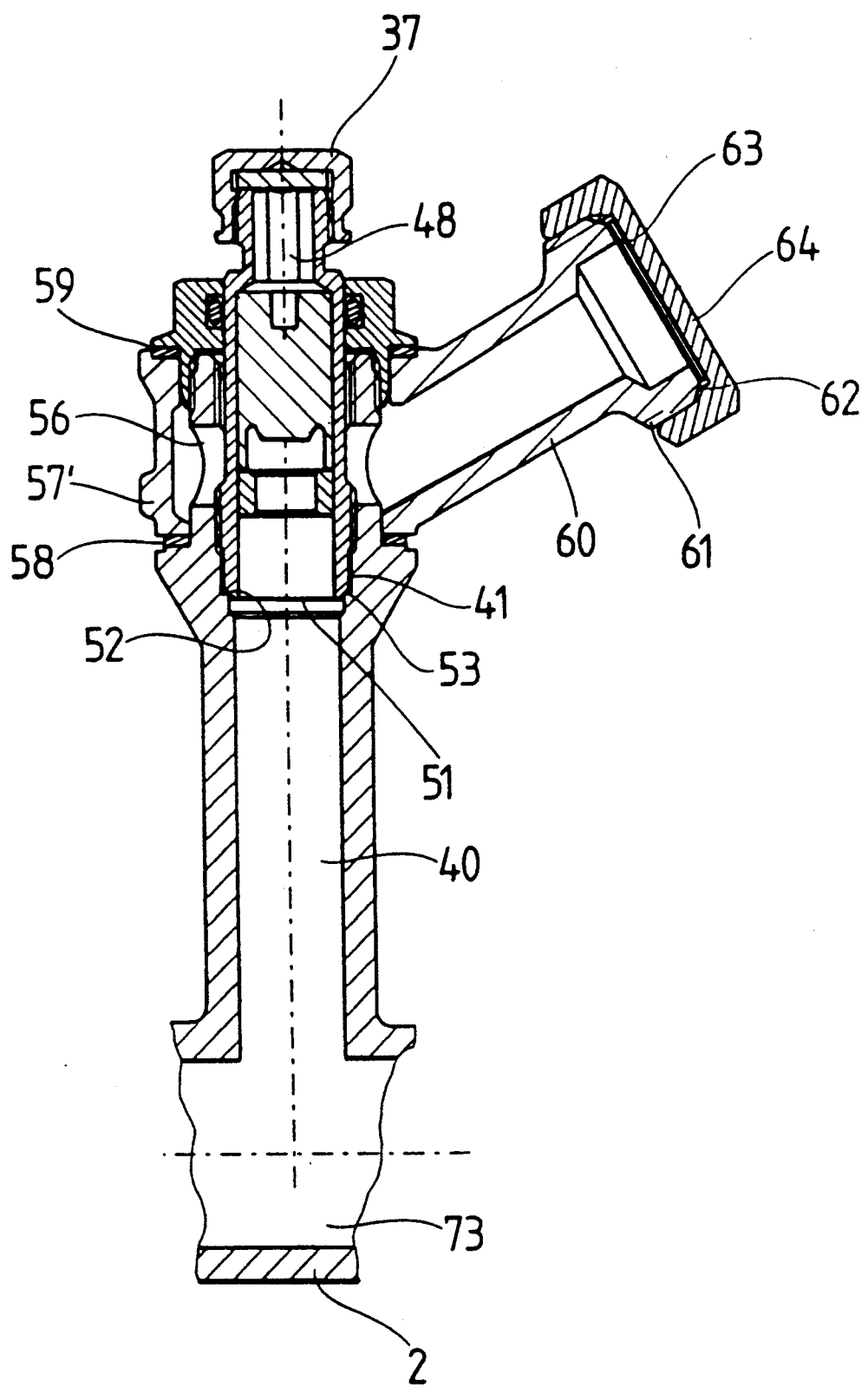

According to an embodiment, which is not shown, the shape of hole 31 described above and shown in FIG. 3 can also be combined with the valve embodiments according to FIG. 1 or 2.

We claim:

1. An apparatus for measuring and controlling at least one of temperature and pressure in a fluid medium channel comprising:

said channel being provided in a housing (2), a passage (30, 31, 40, 41) passing through said housing into said channel, at least one measuring and control nipple (50, 74) being inserted in said passage, such that said channel is in communication with said at least one nipple via said passage, wherein said at least one nipple is a multiple function nipple that provides the additional functions of discharging fluid, filling fluid, and air removal, a neck (55) on said housing surrounds an outer portion of said passage, a casing (57, 57') surrounds said neck and is spaced therefrom forming a space therbetween, outlet openings (56) pass through said neck, one end of said outlet openings communicate with said passage and the other end of said outlet openings communicate with said space, a connection (60) is provided in said casing in communication with said space for executing said additional functions, a sealing body (3)4 contained within said nipple, a slit (72) in said sealing body for the insertion of a measuring probe into and through said sealing body such that said probe extends through said sealing body into said passage into communication with said channel to measure said at least one of pressure and temperature.

2. An apparatus according to claim 1, further comprising a partition wall (5) in said fluid channel dividing said channel into an inlet (3) and an outlet (4), said partition wall forming a seat (6) for co-operation with a valve-body (7) attached to an inner end of a valve spindle (8, 15), said valve spindle being controlled from outside said housing, said multiple function nipple (50) being connected to said inlet (3) via said passage, and a second nipple (74) being one of a single function nipple and a multiple function nipple connected to said outlet (4).

3. An apparatus according to claim 1, wherein said multiple function nipple (50) is connected to said inlet (3) and to said outlet 45, one of said connections is closeable.

4. An apparatus according to claim 1, wherein said passage (40, 41) has an inner smooth portion and an outer threaded portion (54) into which said nipple is threaded, a sharp step forming a seat (53) is located at a transition between said smoothly portion and said threaded portion of said passage, an inner end (51) of said nipple has a surrounding bevel thereon that sealing engages said seat.

5. An apparatus according to claim 4, further comprising, a nut (66) having internal threads (65), said neck (55) having external threads (65), said nut being threaded onto said neck thereby compressing said end packings (58, 59) when said nut is tightened thereby sealing said casing (57, 57').

6. An apparatus according to claim 5, further comprising, a central access opening (67) passing through the center of said nut (66), a groove (68) in said access opening, an O-ring (69) in said groove (68), said multi-function nipple having a thread free outer end sized to slip fit in said access opening, said O-ring sealingly engaging said thread free outer end, said nipple having an externally threaded portion adjacent said outer portion sized too large to pass through said access opening, whereby said nipple is threaded in said passage via said externally threaded portion.

7. An apparatus according to claim 6, further comprising, a hexagon-shaped outer opening (38) in the outer end of said multiple function nipple for receiving a hexagon-shaped spanner therein by which said nipple is screwed inward and outward in said passage thereby respectively engaging said bevel with said seat such that said bevel and said seat are sealingly engaged sealing fluid in said passage and disengaging said bevel from said seat thereby forming a opening between said bevel and said seat such that fluid may be one of filled and discharged through said connector, said outlet openings, and between said bevel and said seat, the outer end of said nipple having an externally threaded portion, an internally threaded cover is removably threaded onto said outer end such that the cover is removable to allow insertion of said spanner and said measuring probe into said nipple, a hinge element retaining said cover on said outer end.

8. An apparatus according to claim 1, wherein said casing is limited in an axial direction by packings (58, 59) at each end, and is, at least to a limited extent, rotatably mounted on said neck.

9. An apparatus according to claim 1 further comprising, said connector (60) on said casing (57') having a free end, external threads (61) on the free end of said connector (60), a cover (64) having internal threads (62) being screwed on said free end, said cover being removable in order to connect one of a discharge hose and a filling hose to said free end.

10. An apparatus according to claim 1, wherein said passage is axially extended forming a straight continuation of said passage, an inner corner of said continuation being in communication with said fluid channel.

* * * * *